United States Patent
Shikata

(10) Patent No.: US 7,219,248 B2
(45) Date of Patent: May 15, 2007

(54) SEMICONDUCTOR INTEGRATED CIRCUIT OPERABLE TO CONTROL POWER SUPPLY VOLTAGE

(75) Inventor: Takashi Shikata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 10/968,120

(22) Filed: Oct. 20, 2004

(65) Prior Publication Data

US 2005/0283626 A1 Dec. 22, 2005

(30) Foreign Application Priority Data

Jun. 21, 2004 (JP) ............................. 2004-182468

(51) Int. Cl.
*G06F 1/32* (2006.01)
(52) U.S. Cl. ..................... 713/323; 713/2; 713/322
(58) Field of Classification Search ............... None
See application file for complete search history.

(56) References Cited

U.S. PATENT DOCUMENTS 5,511,182 A * 4/1996 Le et al. ..................... 713/600
6,671,815 B2 * 12/2003 Iwamura et al. ............ 713/324
6,983,388 B2 * 1/2006 Kaxiras et al. ............. 713/324
7,036,029 B2 * 4/2006 May et al. .................. 713/320
2004/0104454 A1 6/2004 Takaota et al.

FOREIGN PATENT DOCUMENTS

| JP | 10-78836 | 3/1998 |
| JP | 2002-297561 | 10/2002 |
| JP | 2002-297563 | 10/2002 |
| JP | 2004-78772 | 3/2004 |

* cited by examiner

*Primary Examiner*—Thuan Du
(74) *Attorney, Agent, or Firm*—Staas & Halsey LLP

(57) ABSTRACT

A semiconductor integrated circuit includes a CPU core unit, an on-chip-bus unit coupled to the CPU core unit, a on-chip memory directly connected to the on-chip-bus unit, and a voltage controlling unit configured to control a power supply voltage for driving the CPU core circuit and to output a boot switch signal, the on-chip-bus unit configured to switch a boot address between the memory and another device in response to a state of the boot switch signal when the CPU core unit fetches boot program instructions from the boot address.

9 Claims, 8 Drawing Sheets

SEMICONDUCTOR INTEGRATED CIRCUIT OPERABLE TO CONTROL POWER SUPPLY VOLTAGE

CROSS-REFERENCE TO RELATED APPLICATIONS

The present application is based upon and claims the benefit of priority from the prior Japanese Patent Application No. 2004-182468 filed on Jun. 21, 2004, with the Japanese Patent Office, the entire contents of which are incorporated herein by reference.

BACKGROUND OF THE INVENTION

1. Field of the Invention

The present invention generally relates to semiconductor integrated circuits, and particularly relates to a semiconductor integrated circuit which controls a power supply voltage for the purpose of reducing power consumption.

2. Description of the Related Art

In Semiconductor integrated circuits, and battery-driven portable terminals in particular, it is required to reduce power consumption. In order to reduce power consumption, clock signals are conventionally suspended by use of a gated clock method. With the development of the semiconductor process technology, processors or the like are now manufactured with fine patterns smaller than 0.13 micrometers. With such fine patterns., leak currents that were conventionally treated as errors may account for a substantial proportion that cannot be disregarded. Leak currents flow all the time regardless of the active/inactive state of processors, and cannot be suppressed by the gated clock method that suspends clock signals. When the processors or the like are in the standby state, in particular, leak currents continue to flow despite the suspension of clock signals unless the internal voltage inside the chip is suppressed.

In consideration of the influence of leak currents, some methods are beginning to be employed that suspend the supply of an internal operating voltage except for a portion of a power-supply control circuit or the like inside a chip when the processor is put into a standby state. Patent Document 1, for example, discloses a circuit configuration in which the sequential circuits of a CPU and core circuitry are implemented by use of a plurality of flip-flops and a plurality of combinatorial circuits permitting scans. In order to reduce the leak currents of the data processing device in a standby mode, the data stored in the flip-flops are saved through scan chains to a ferroelectric memory under the control of a control circuit before a transition is made from a normal mode to the standby mode. Further, Patent Document 2 discloses a configuration in which memory devices constituting the registers of a microcomputer are implemented by use of nonvolatile memories that are overwritable. In this configuration, the supply of a power supply voltage is suspended without evacuating data stored in the registers.

Moreover, Patent Document 3 discloses a technology that does not control power supply, but that is relevant as it relates to a booting method. The disclosed technology relates to a configuration in which booting is performed by referring to the contents of a nonvolatile memory, and recovery to a desired program state is achieved from any program execution state in response to the contents of the nonvolatile memory without going through a reset sequence. Further, Patent Document 4 discloses a configuration in which the areas of an on-chip nonvolatile memory are segregated so that the protocol codes of user-dedicated communication are not destroyed even when the computer goes out of control.

[Patent Document 1] Japanese Patent Application Publication No. 10-78836

[Patent Document 2] Japanese Patent Application Publication No. 2004-78772

[Patent Document 3] Japanese Patent Application Publication No. 2002-297563

[Patent Document 4] Japanese Patent Application. Publication No. 2002-297561

The technology described in Patent Document 1 requires a special configuration for evacuating and recovering registers by use of scan chains dedicated for register evacuation. This present a problem in that the circuit of a CPU core or the like having already been developed cannot be utilized. It may be plausible to save the contents of registers to an external SDRAM or nonvolatile memory. Since access to a memory device external to the chip is slow compared to access to a memory inside the chip, however, the evacuation and recovery of register data requires a lengthy processing time.

In order to keep the influence of leak current to a minimum, some methods are beginning to be employed that lower an internal operating voltage to reduce leak currents during a period in which the processor or the like does not need to operate at high speed, and that raise the internal voltage during a period in which high-speed operation is required. In such a case, there is a risk of the processor suffering a hangup as it becomes incapable of executing instructions due to internal voltage reduction. In consideration of this, vital register data and the like are saved to an external memory in advance. Upon a hangup, the CPU core or the like is initialized, and the saved register data and the like are recovered to permit a continued operation. Even in such case, however, access to a memory device external to the chip is slower than access to a memory inside the chip, thereby requiring a lengthy processing time for the evacuation and recovery of the register data.

Accordingly, there is a need for a semiconductor integrated circuit that allows various register values to be readily saved and recovered at high speed when a standby state for suspending the supply of an internal operating voltage or a state for lowering an internal operating voltage is put into effect.

SUMMARY OF THE INVENTION

It is a general object of the present invention to provide a semiconductor integrated circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a semiconductor integrated circuit particularly pointed out in the specification in such full, clear, concise, and exact terms as to enable a person having ordinary skill in the art to practice the invention.

To achieve these and other advantages in accordance with the purpose of the invention, the invention provides a semiconductor integrated circuit, including a CPU core unit, an on-chip-bus unit coupled to the CPU core unit, a on-chip memory directly connected to the on-chip-bus unit, and a voltage controlling unit configured to control a power supply voltage for driving the CPU core circuit and to output a boot switch signal, the on-chip-bus unit configured to switch a boot address between the memory and another device in response to a state of the boot switch signal when the CPU core unit fetches boot program instructions from the boot address.

According to another aspect of the invention, the CPU core unit includes an internal register, the CPU core unit configured to save a register value of the internal register to the memory at a time of the transition to the second power supply voltage state, and configured to recover the register value from the memory to the internal register according to the boot program instructions fetched from the memory at the time of the return to the first power supply voltage state.

According to at least one embodiment of the invention, the boot instructions are fetched directly from the memory such as an internal RAM or the like connected to the on-chip bus, rather than fetched from a boot ROM through a normal access path. This eliminates a need to access the boot ROM that is extremely slow, and significantly reduces the number of processing steps, thereby achieving high-speed register evacuation and recovery in a simple and efficient manner.

Further, the simple and high-speed evacuation and recovery of register values are achieved simply by providing the memory accessible through the on-chip bus and a means to switch an address accessed by the on-chip bus, without a need to make substantial modification to the logic of the CPU core unit of a processor.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
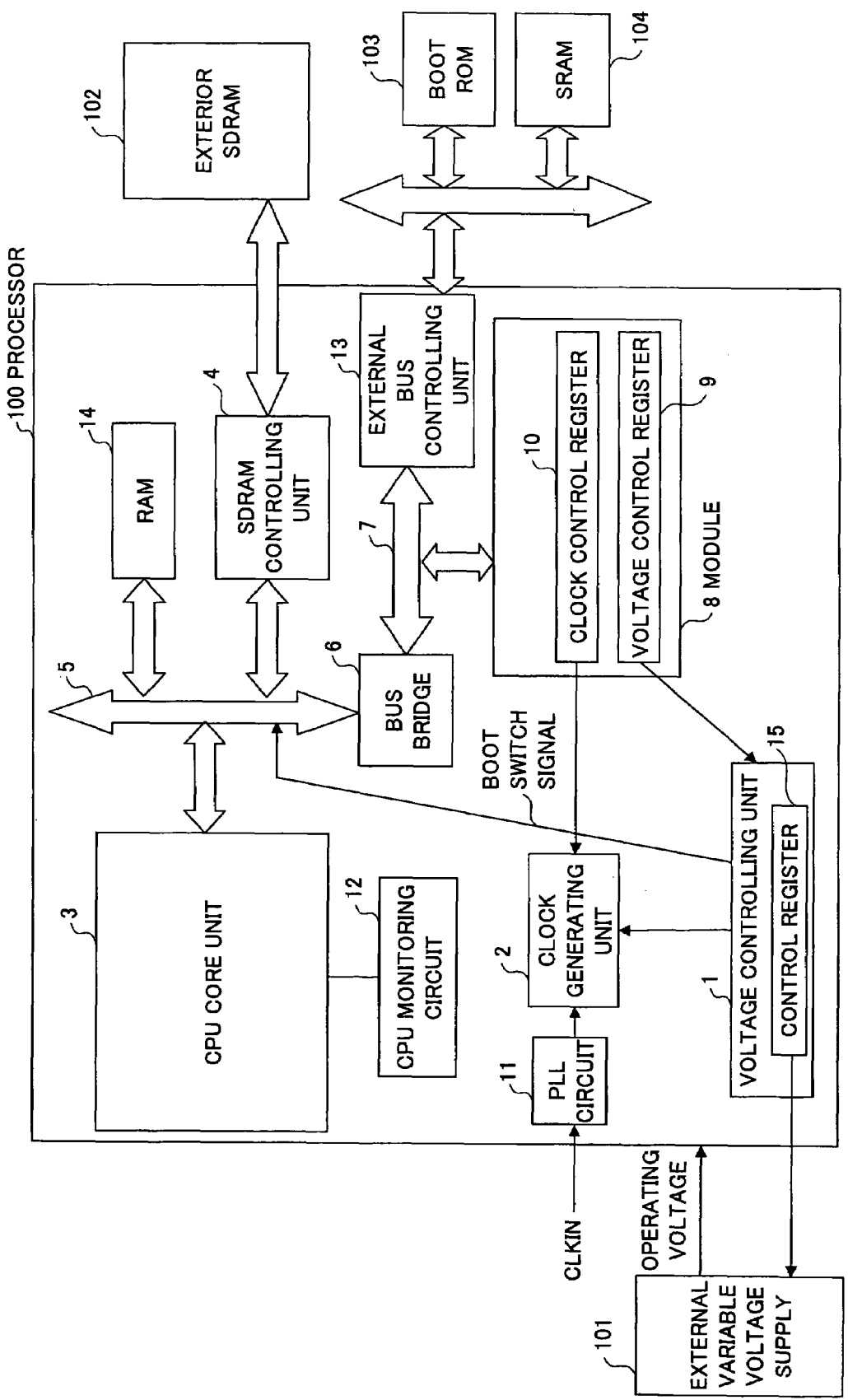
FIG. 1 is a block diagram showing an example of the configuration of an embodiment of a semiconductor integrated circuit according to the present invention.

FIG. 1 is a block diagram showing an example of the configuration of an embodiment of a semiconductor integrated circuit according to the present invention. A semiconductor integrated circuit (processor) 100 of FIG. 1 includes a voltage controlling unit 1, a clock generating unit 2, a CPU core unit 3, an SDRAM controlling unit 4, an on-chip bus 5, a bus bridge 6, an internal peripheral bus 7, a module 8, a voltage control register 9, a clock control register 10, a PLL circuit 11, a CPU monitoring circuit 12, an external bus controlling unit 13, and an internal RAM 14. The processor 100 receives a voltage from an external variable voltage supply 101. The SDRAM controlling unit 4 of the processor 100 is connected to the exterior SDRAM 102. The external bus controlling unit 13 of the processor 100 is connected to an external boot ROM 103 and an external SRAM 104.

The SDRAM controlling unit 4 provides an interface with the exterior SDRAM 102. The bus bridge 6 provides an interface between the on-chip bus 5 and the internal peripheral bus 7. The external bus controlling unit 13 provides an interface with the boot ROM 103 and the SRAM 104. In the module 8, the voltage control register 9 stores settings for controlling the operation of the voltage controlling unit 1 by use of software. The clock control register 10 stores settings for controlling the clock speed and clock supply/suspension of the clock generating unit 2 by use of software. These registers are accessible through buses by the CPU core unit 3, and are controlled by program instructions executed in the CPU core unit 3. The PLL circuit 11 generates a frequency-multiplied clock signal synchronized with a clock signal CLKIN supplied from an exterior, and supplies the generated clock signal to the clock generating unit 2.

The operating voltage of the processor 100 is supplied from the external variable voltage supply 101. It is possible to suspend the supply of the operating voltage or lower the operating voltage of the processor 100 by controlling the external variable voltage supply 101 through a control signal output from the voltage controlling unit 1 of the processor 100. The clock generating unit 2 of the processor 100 generates operating clock signals for provision to individual modules including the CPU core unit 3 based on the frequency-multiplied clock signal supplied from the PLL circuit 11. The CPU monitoring circuit 12 monitors the operation of the CPU core unit 3, and detects a failure such as a hangup.

The boot ROM 103 stores therein a boot program. During the power-on operation initiated from a complete power-off state, the CPU core unit 3 reads this boot program stored in the boot ROM 103. In the present invention, the boot program is stored in the internal RAM 14, and register values necessary for the resumption of an operation are saved to the internal RAM 14 when a transition is to be made to shift into a standby state in which power supply is partially suspended for the purpose of reducing power consumption or into a voltage-stepped-down state in which the internal operating voltage is reduced.

Specifically, when a transition to a standby state or a voltage-stepped-down state is to be made, a boot program code for recovering from the standby state or the like is stored in a particular area of the internal RAM 14, e.g., a certain address range starting from the top address. Further, saved register values are stored in other particular address areas. The power supply of the internal RAM 14 is maintained in the standby state.

When recovering from the standby state or from the hangup of the CPU core unit 3 having occurred in the voltage-stepped-down state, an address from which the CPU core unit 3 reads the boot program is switched to the internal RAM 14 under the control of the on-chip bus 5. With this provision, the CPU core unit 3 reads the boot program from the internal RAM 14 to execute boot instructions and to return the saved register values from the internal RAM 14 to individual registers.

In order for the on-chip bus 5 to recognize that a recovery is to be made from a standby state or a voltage-stepped-down state, it suffices to provide a control register 15 in the voltage controlling unit 1. The control register 15 is set to a value indicative of a standby state, a value indicative of a hangup, a value indicating that the boot code (boot program instructions) and saved register data are stored in the internal RAM 14, etc. When the control register 15 is set to such value, the voltage controlling unit 1 asserts a boot switch signal. In response to the assertion of the boot switch signal from the voltage controlling unit 1, the on-chip bus 5 recognizes that the recovery is being made from a standby state or from a voltage-stepped-down state, and that a register recovery operation is necessary. The on-chip bus 5 thus switches a fetch address for the CPU core unit 3 to read the boot program instructions, so that the internal RAM 14 becomes a new fetch address.

With the provision described above, booting and register recovery can be performed at high speed. This is because the operating frequency of the on-chip bus 5 and the internal RAM 14 is higher than the operating frequency of the boot ROM 103.

If the CPU monitoring circuit 12 is not provided, recovery from the complete hangup of the CPU core unit 3 can only be made by initializing the entirety of the system through the power-on reset operation of the board. Since the CPU monitoring circuit 12 is provided as shown in FIG. 1, a predetermined recovery operation can be performed in response to the detection of a hangup.

Namely, when a transition to a voltage-stepped-down state having a reduced operating voltage is to be made, vital register values are saved to the internal RAM 14. When the CPU monitoring circuit 12 detects a hangup caused by voltage reduction, the voltage controlling unit 1 receives a signal indicative of the detection of a hangup, for example, thereby initializing individual internal modules such as the CPU core unit 3. Recognizing that a register recovery is needed based on the boot switch signal, the on-chip bus 5 redirects a bus access request from the boot ROM 103 to the internal RAM 14 when the bus access request is issued by the CPU core unit 3 to fetch boot program instructions. As a result, the CPU core unit 3 performs a boot operation from the internal RAM 14, and recovers the register values or the like saved in the internal RAM 14 to the registers. Thereafter, the CPU core unit 3 resumes an operation that was being performed before the hangup.

In the present invention as described above, the boot instructions are fetched directly from the internal RAM 14 connected to the on-chip bus 5, rather than fetched from the boot ROM 103 through a normal access path. This eliminates a need to access the boot ROM 103 that is extremely slow, and significantly reduces the number of processing steps, thereby achieving high-speed register evacuation and recovery in a simple and efficient manner.

The internal RAM 14 used for resister evacuation and the like may be used as a work area during a routine, normal operation. In other words, if there is an existing RAM connected to the on-chip bus 5, the provision of the control register 15 and slight modification to the circuit configuration of the on-chip bus 5 may be sufficient for the purpose of achieving high-speed register evacuation and recovery.

Figure 2:
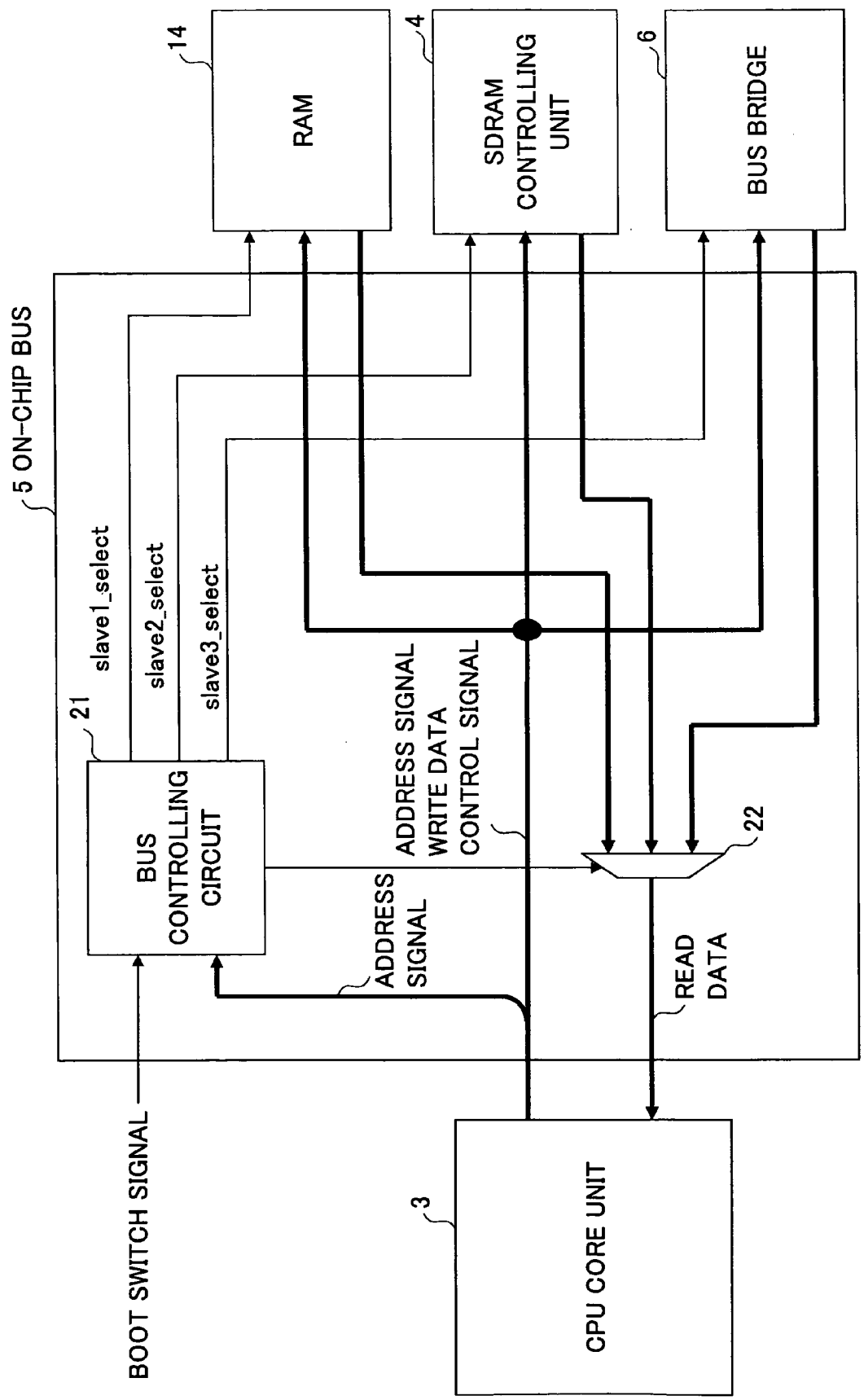
FIG. 2 is a block diagram showing an example of the configuration of an on-chip bus.

FIG. 2 is a block diagram showing an example of the configuration of the on-chip bus 5. The on-chip bus 5 of FIG. 2 is connected to the CPU core unit 3 serving as a sole bus master, and is also connected to the internal RAM 14, the SDRAM controlling unit 4, and the bus bridge 6, which serve as three bus slaves. The on-chip bus 5 includes a bus controlling circuit 21, a selector 22, and various bus signal lines.

An address signal, write data signal, and control signal output from the CPU core unit 3 serving as the bus master are supplied to each bus slave. The address signal is also supplied to the bus controlling circuit 21. In response to the address signal from the CPU core unit 3, the bus controlling circuit 21 selectively asserts one of the slave selection signals slave1_select through slave3_select, thereby selecting an address accessed by the CPU core unit 3. If the boot switch signal responsive to the control register 15 is asserted, the internal RAM 14 is selected as the address to be accessed for boot-instruction fetch. Read data from each bust slave is selected by the selector 22, and is transmitted to the CPU core unit 3 serving as the bus master.

Figure 3:
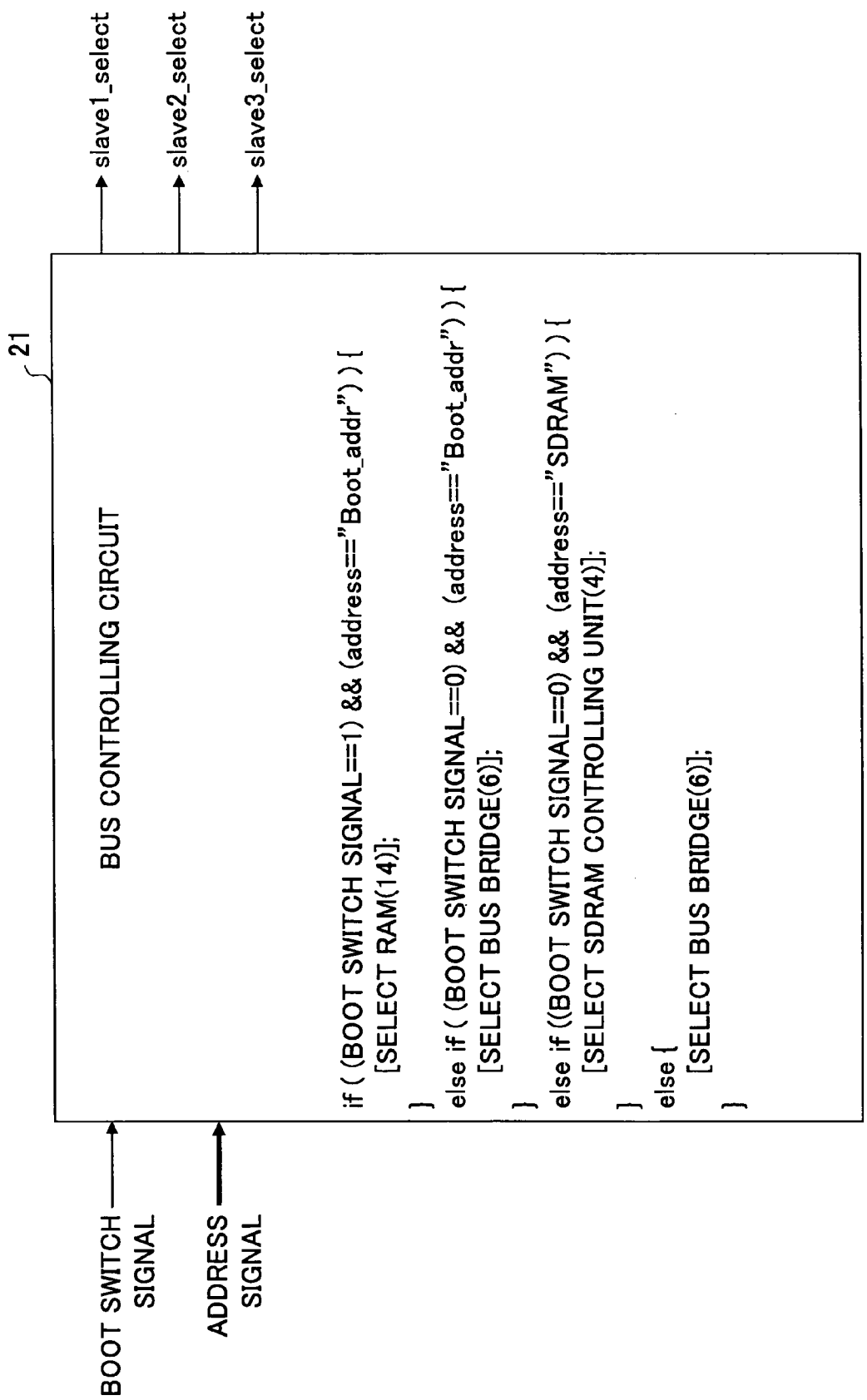
FIG. 3 is a drawing showing an example of the logic configuration of a bus controlling circuit.

FIG. 3 is a drawing showing an example of the logic configuration of the bus controlling circuit 21. In FIG. 3, a bus slave to be accessed is selected in response to the boot switch signal and the address signal according to logic provided in the box of the bus controlling circuit 21. Where the address signal indicates a boot address Boot_addr, the internal RAM 14 is selected as the source of booting operation if the boot switch signal is asserted ("1"). If the boot switch signal is negated ("0") the bus bridge 6 is selected even where the address signal indicates the boot address Boot_addr. As a result, a boot operation is performed based on the boot ROM 103 via the bus bridge 6, the internal peripheral bus 7, and the external bus controlling unit 13. If the boot switch signal is negated ("0") and the address signal indicates SDRAM, the SDRAM controlling unit 4 is selected. Otherwise, the bus bridge 6 is selected.

Figure 4:
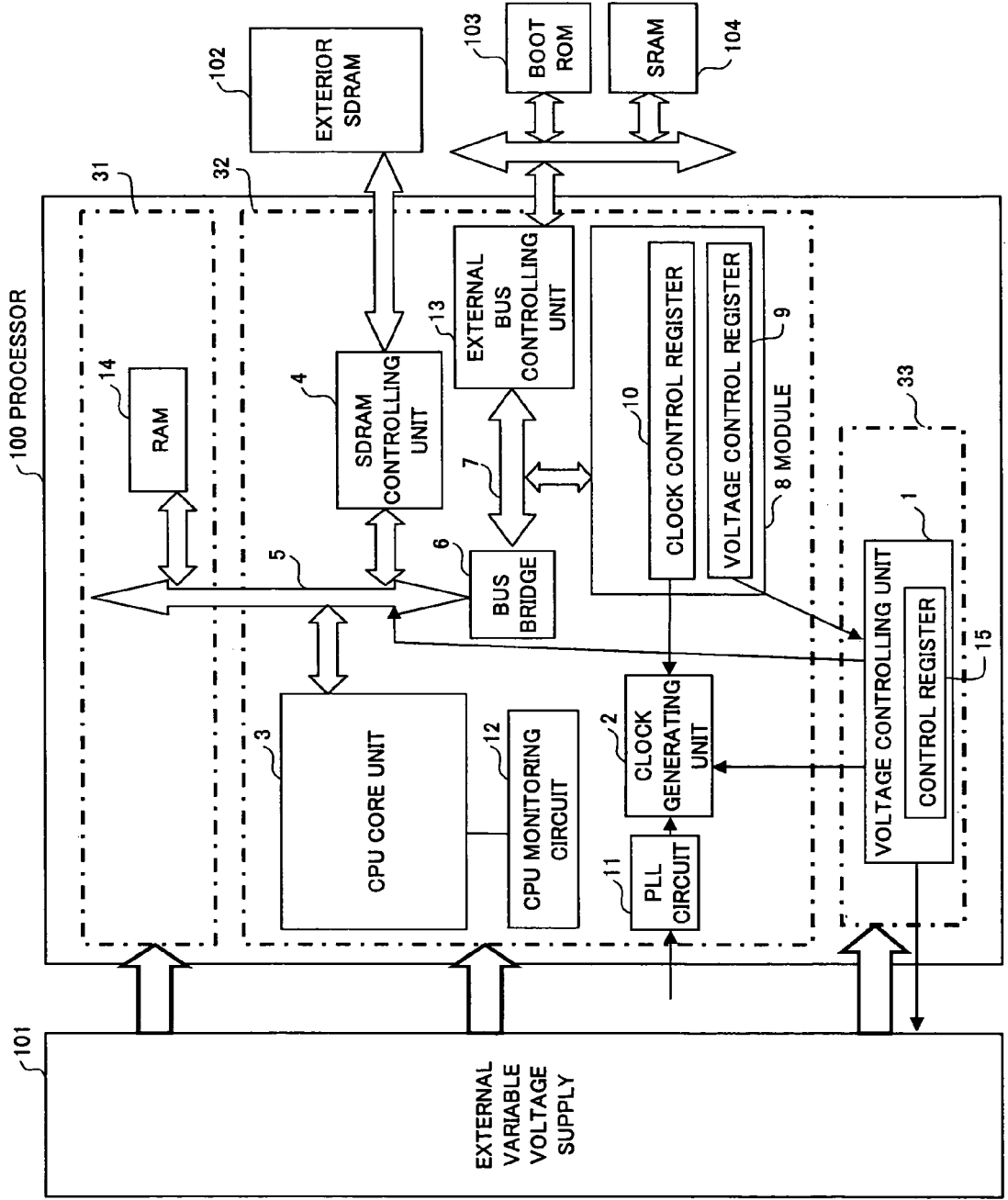
FIG. 4 is a block diagram showing the configuration of power-supply blocks of a processor shown in FIG. 1.

FIG. 4 is a block diagram showing the configuration of power-supply blocks of the processor 100 shown in FIG. 1. In FIG. 4, the same elements as those of FIG. 1 are referred to by the same numerals, and a description thereof will be omitted.

The processor 100 of FIG. 4 has the same circuit configuration as that of FIG. 1, but has a power supply thereof divided into three blocks. The internal RAM 14 is situated in a power supply block 31, and the voltage controlling unit 1 is provided in a power supply block 33. The other elements constituting the processor 100 are provided in a power supply block 32. The power supply blocks 31 through 33 receive respective, separate power supplies from the external variable voltage supply 101, and are configured to control the power supply independently of each other. In a standby state, power supply is suspended only with respect to the power supply block 32 in which a majority of circuits inclusive of the CPU core unit 3 are situated whereas the power supply block 31 and the power supply block 33 continue to receive the internal voltage. With this provision, leak currents are reduced in the standby state while the internal RAM 14 storing saved register values and the voltage controlling unit 1 necessary for voltage control are allowed to operate.

In the case of voltage controlling operation, the operating voltage is lowered only with respect to the power supply block 32 to reduce leak currents, whereas the operating voltage is maintained with respect to the power supply block 31 where the internal RAM 14 is situated, thereby ensuring that the saved register values and the like are not lost. In this case, it is preferable to couple level-converter cells to various signal lines (address signal lines, write-data lines, a write-enable line, read-data lines, etc.) used for accessing the internal RAM 14.

Figure 5:
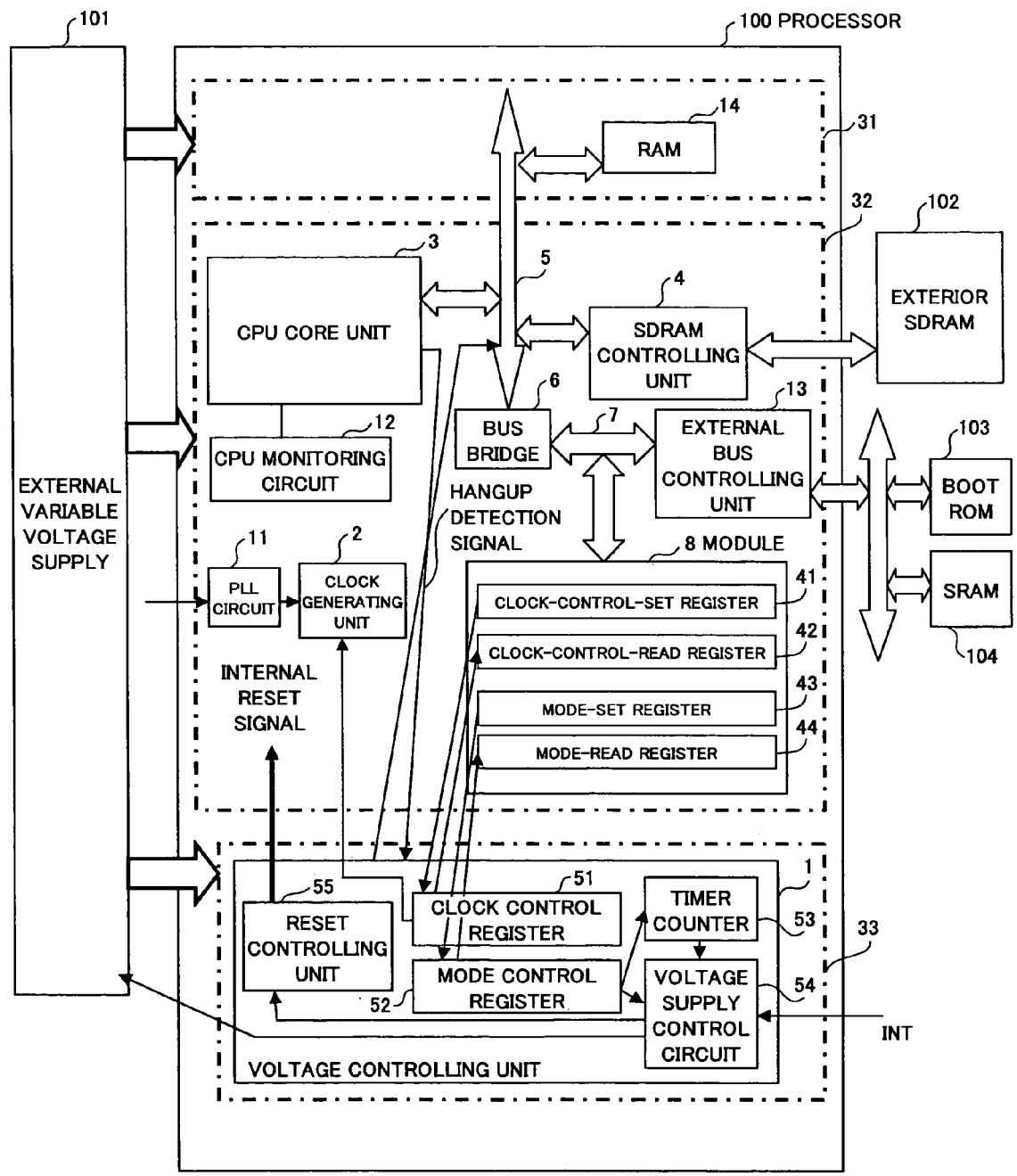
FIG. 5 is a block diagram showing the configuration of a variation of the processor shown in FIG. 4.

FIG. 5 is a block diagram showing the configuration of a variation of the processor 100 shown in FIG. 4. In FIG. 5, the same elements as those of FIG. 4 are referred to by the same numerals, and a description thereof will be omitted.

In FIG. 5, power supply is divided into the three power supply blocks 31 through 33 in the same manner as in FIG. 4, which are independently controllable. At the time of a standby mode, the power supply of the power supply block 32 is suspended so as to reduce leak currents. The supply of power is maintained with respect to the internal RAM 14 storing saved register values and the voltage controlling unit 1 needed for voltage control, thereby making it possible to perform booting and register recovery at high speed at the time of return from the standby state. In such configuration, however, leak currents continue to flow in the voltage controlling unit 1 that continue to receive power supply even at the time of a standby mode. This makes it desirable to reduce the circuit size of the voltage controlling unit 1 as small as possible.

In consideration of this, a clock control register 51 and a mode control register 52 for keeping particular bits that need to be maintained at the time of standby are provided in the voltage controlling unit 1 as a special feature given to the voltage controlling unit 1. The control register 15 of FIG. 15 may be part of the mode control register 52. An access to the clock control register 51 is made through a clock-control-set register 41 and a clock-control-read register 42 connected to the internal peripheral bus 7. Further, an access to the mode control register 52 is made through a mode-set register 43 and a mode-read register 44.

With this provision, there is no need to include in the voltage controlling unit 1 a bus-interface circuit or the like for allowing the CPU core unit 3 to access the clock control register 51 and the mode control register 52. This makes it possible to supply power to registers no more than necessary at the time of standby. Here, the clock-control-set register 41 and the clock-control-read register 42 may alternatively be provided as one and the same register, and the mode-set register 43 and the mode-read register 44 may alternatively be provided as one and the same register. These registers may be implemented as actual registers capable of storing data, or may be provided simply as signal lines that extend from the modules 8 to the voltage controlling unit 1.

In order to reduce leak currents further, a voltage may be lowered with respect to the power supply block 31 for the internal RAM 14 at the time of standby. Also, provision may be made to raise the voltage of the power supply block 31 at the time of return from the standby state. Since leak currents increase as the voltage is increasingly raised, a drop in the supplied voltage can reduce leak currents in the internal RAM 14.

In order to reduce leak currents further, the voltage controlling unit 1 provided in the power supply block 33 that continues to receive voltage supply at the time of standby may be configured such that low-leak (high-Vth) transistors are employed as circuit devices constituting the circuitry. Since the voltage controlling unit 1 is generally not required to operate at high processing speed, the use of such low-leak transistors does not cause any trouble.

In the configuration shown in FIG. 5, a timer counter 53 operable at low-speed clock is provided in the voltage controlling unit 1. This makes it possible to activate a voltage supply control circuit 54 in response to a trigger that is not only an interruption signal INT from an exterior but also a periodic interruption signal supplied from the timer counter 53, thereby returning from the standby state. Further, a reset controlling unit 55 for initializing the individual modules of the CPU core unit 3 is provided for use at the time of return from the standby state or the like.

When the CPU monitoring circuit 12 detects the hangup of the CPU core unit 3 at the time of operating-voltage control or the like, the reset controlling unit 55 asserts an internal reset signal in response to the receipt of a hangup detection signal by the voltage supply control circuit 54 or the reset controlling unit 55. Concurrently with this, the voltage supply control circuit 54 sends an instruction to the external variable voltage supply 101 to raise the internal operating voltage, followed by deactivating the internal reset signal. With this provision, it is possible to return the voltage to a safe level before performing high-speed register recovery and resuming an operation.

Figure 6:
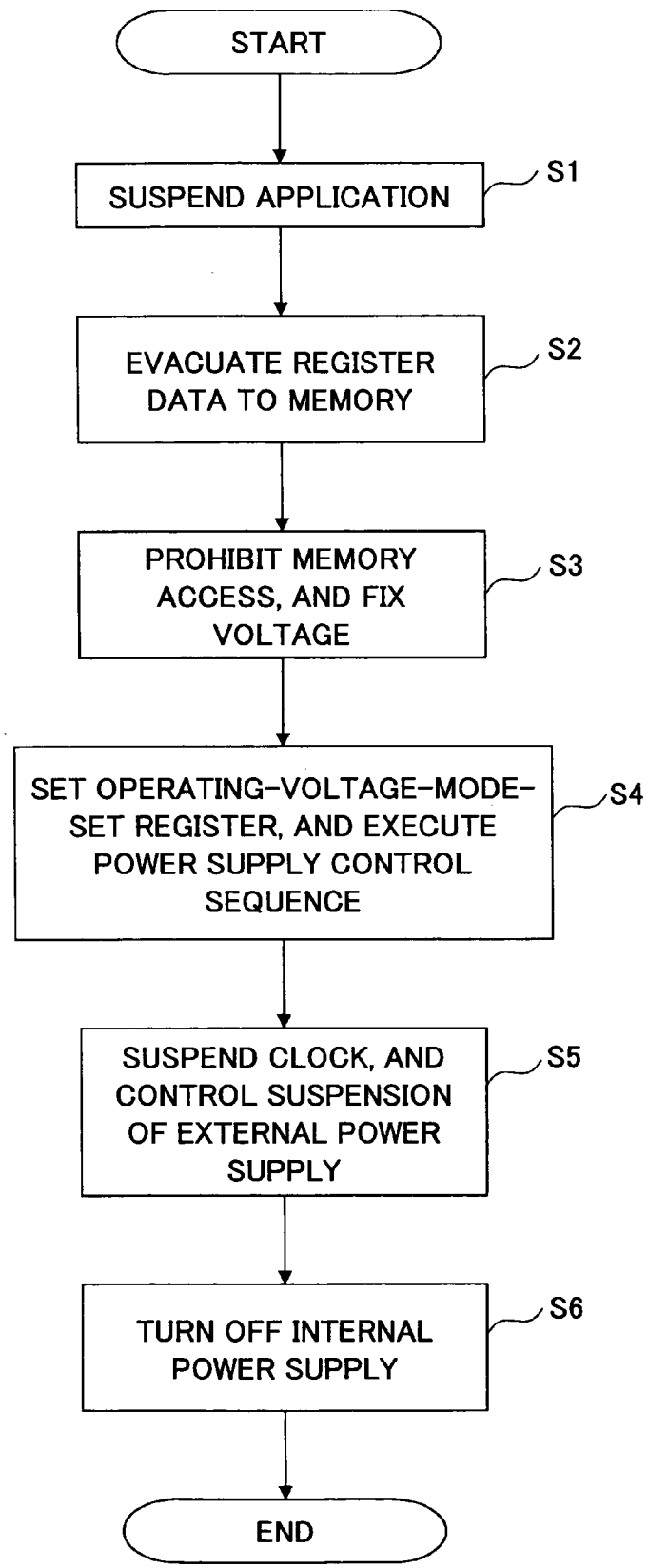
FIG. 6 is a flowchart showing a process performed at the time of transition to a standby state according to the present invention.

FIG. 6 is a flowchart showing a process performed at the time of transition to a standby state according to the present invention.

At step S1 of FIG. 6, an ongoing application is suspended. At step S2, register data and the like that need to be saved, together with a boot program for recovery are stored in the internal RAM 14. At step S3, access to the internal RAM 14 to which the register values and the like are saved is prohibited, and the voltage of the internal RAM 14 is changed to and fixed at a lower voltage in order to suppress the leak currents of the internal RAM 14 at the time of standby. At step S4, information for use at the time of recovery such as information indicative of the need to recover the saved register values is set in the mode-set register or the like, and a predetermined power supply control sequence is activated for the purpose of shifting into a standby state. At step S5, the clock generating unit 2 suspends clocks according to the instruction from the voltage controlling unit 1, and the voltage controlling unit 1 issues an instruction to the external variable voltage supply 101 so as to suspend the supply of the internal power supply voltage except for the power supply of the voltage controlling unit 1 and the internal RAM 14. At step S6, the external variable voltage supply 101 suspends voltage supply in response to the instruction.

Figure 7:
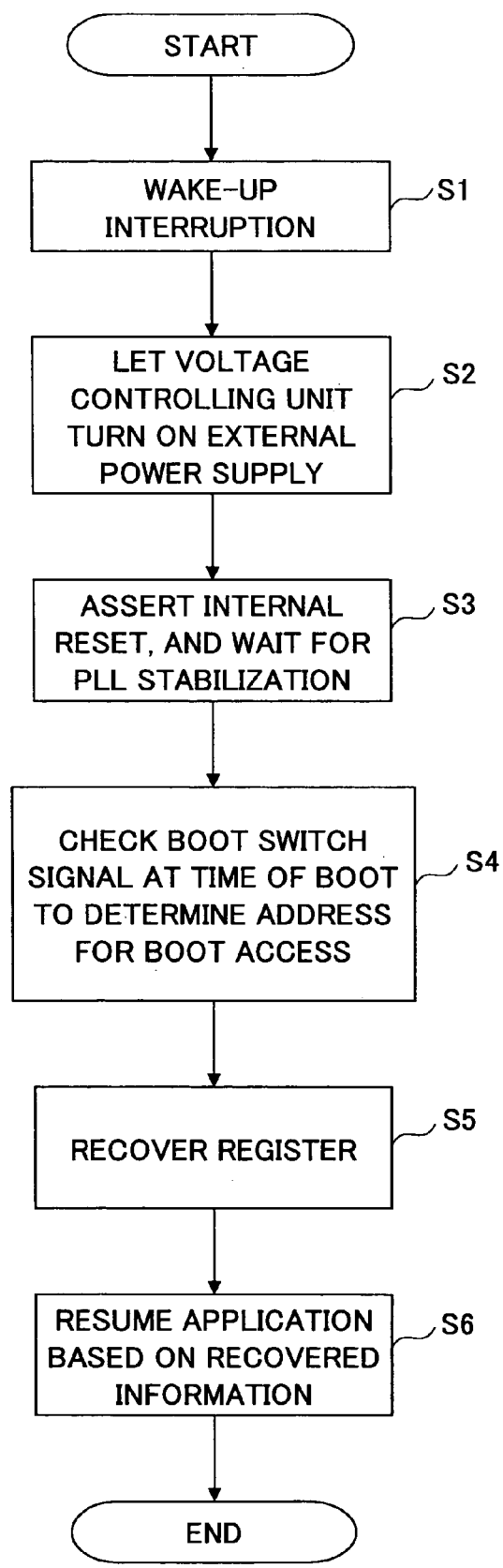
FIG. 7 is a flowchart showing a process performed at the time of return from a standby state according to the present invention.

FIG. 7 is a flowchart showing a process performed at the time of return from a standby state according to the present invention.

At step S1 of FIG. 7, the voltage controlling unit 1 detects that an external interruption or a Wake-up interruption such as a timer interruption or the like has occurred. At step S2, the voltage controlling unit 1 provides a control command to the external variable voltage supply 101, and, in response thereto, external variable voltage supply 101 resumes voltage supply to the CPU core unit 3 and the like. At step S3, an internal reset signal is asserted, and a wait continues until the oscillation of the PLL circuit 11 is stabilized, followed by deactivating the internal reset signal once the oscillation of the PLL circuit 11 is stabilized. At step S4, the CPU core unit 3 initiates a bus access for fetching boot instructions. If the boot switch signal is asserted, a boot operation is performed from the internal RAM 14 connected to the on-chip bus 5 rather than from the external boot ROM 103. At step S5, the boot program stored in one area of the internal RAM 14 recovers the register values and the like saved to another area of the internal RAM 14. At step S6, the execution of the application program is resumed in a continuing fashion based on the recovered register data.

Figure 8:
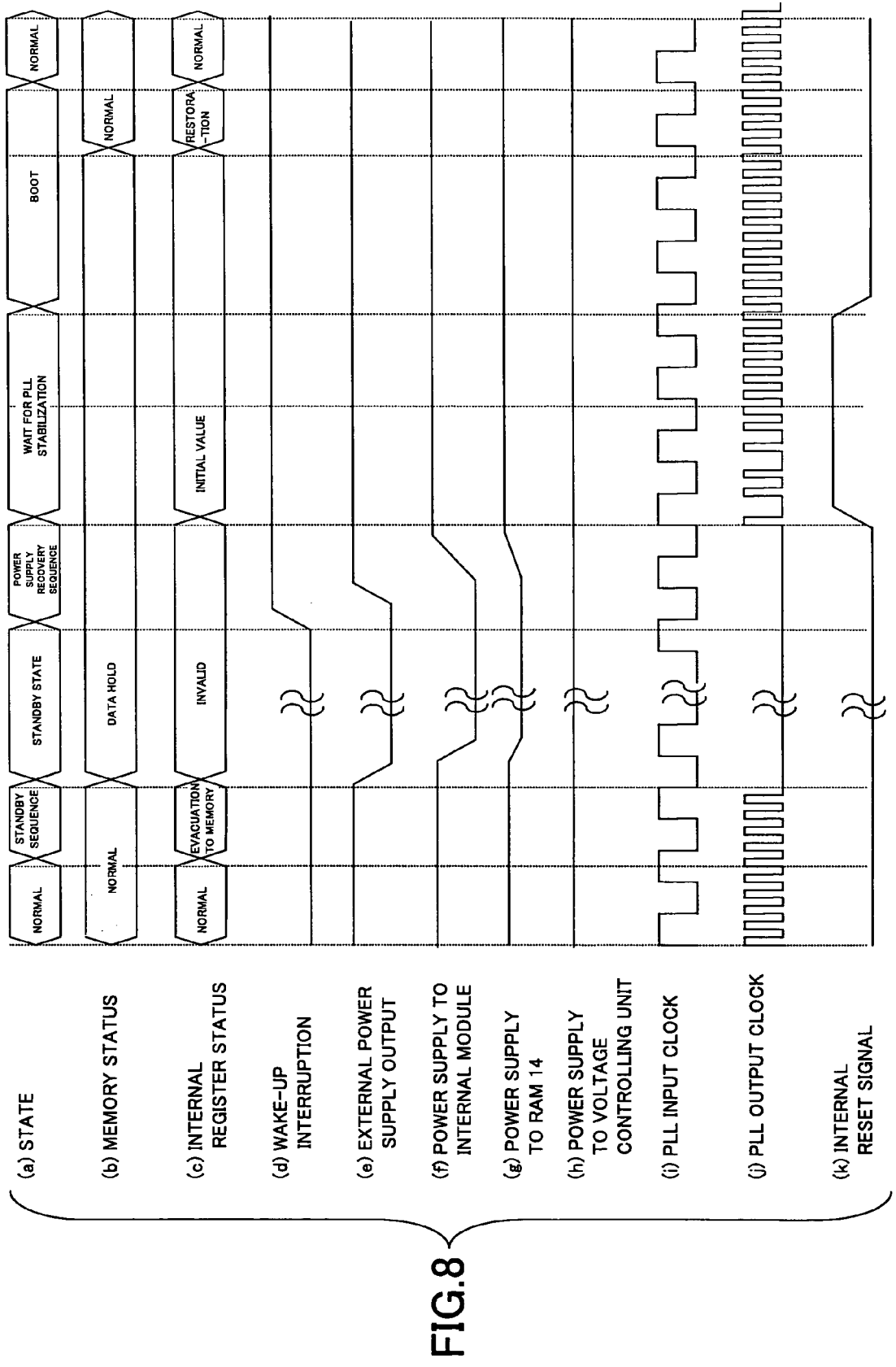
FIG. 8 is a timing chart showing a transition to a standby state and a recovery from the standby state.

FIG. 8 is a timing chart showing a transition to a standby state and a recovery from the standby state. As shown in FIG. 8, a transition from a normal operation to a standby state is made through an intervening standby sequence (see (a)). During the standby sequence, internal register values are saved to the memory (see (c)). In the standby state, the power supply output of the external variable voltage supply 101 is suspended (see (e)), and power supply to internal modules comes to a stop (see (f)).

Even in this case, however, a reduced voltage continues to be supplied to the internal RAM 14 (see (g)), thereby continues the data hold operation (see (b)). Moreover, power supply is maintained with respect to the voltage controlling unit 1 (see (h)). In the standby state, the state of the internal registers becomes unstable (see (c)), and the clock output of the PLL circuit 11 is suspended (see (j)).

A Wake-up interruption then occurs (see (d)), and, in response, each power supply returns to a normal voltage level (see (e), (f), and (g)). An internal reset signal is then asserted (see (k)) with a wait for PLL stabilization. The oscillation of the PLL circuit 11 is stabilized (see (j)). A boot operation is performed after the stabilization of the PLL (see (a)), and the saved register values are restored (see (c)).

With the operations as described above, the processor 100 can recover from a standby state to resume a normal operation.

Further, the present invention is not limited to these embodiments, but various variations and modifications may be made without departing from the scope of the present invention.

What is claimed is:

1. A semiconductor integrated circuit, comprising:
a CPU core unit;
an on-chip-bus unit coupled to said CPU core unit;
a on-chip memory directly connected to said on-chip-bus unit; and
a voltage controlling unit configured to control a power supply voltage for driving said CPU core circuit and to output a boot switch signal,
said on-chip-bus unit configured to switch a boot address between said memory and another device in response to a state of the boot switch signal when said CPU core unit fetches boot program instructions from the boot address.

2. The semiconductor integrated circuit as claimed in claim 1, wherein said voltage controlling unit asserts the boot switch signal at a time of return to a first power supply voltage state subsequent to a transition from the first power supply voltage state to a second power supply voltage state by controlling the power supply voltage, and said on-chip-bus unit assigns the boot address to said memory in response to the assertion of the boot switch signal.

3. The semiconductor integrated circuit as claimed in claim 2, wherein said CPU core unit includes an internal register, said CPU core unit configured to save a register value of said internal register to said memory at a time of the transition to the second power supply voltage state, and configured to recover the register value from said memory to said internal register according to the boot program instructions fetched from said memory at the time of the return to the first power supply voltage state.

4. The semiconductor integrated circuit as claimed in claim 1, wherein said memory is configured to receive power supply independently of said CPU core unit.

5. The semiconductor integrated circuit as claimed in claim 1, wherein during a period in which the power supply voltage is in the second power supply voltage state before the return to the first power supply voltage state subsequent to the transition from the first power supply voltage state to the second power supply voltage state, said voltage controlling unit lowers a power supply voltage of said memory.

6. The semiconductor integrated circuit as claimed in claim 1, further comprising a module accessible from said CPU core unit through said on-chip-bus unit, wherein said CPU core unit is operable to set and read a control register provided in said voltage controlling unit by accessing a register of said module, and said voltage controlling unit determines the state of the boot switch signal in response to a setting of the control register.

7. The semiconductor integrated circuit as claimed in claim 1, further comprising a reset controlling unit configured to generate an internal reset signal for a predetermined time period at the time of the return to the first power supply voltage state subsequent to the transition from the first power supply voltage state to the second power supply voltage state.

8. The semiconductor integrated circuit as claimed in claim 7, further comprising a CPU monitoring circuit configured to detect a hangup of said CPU core unit, wherein said reset controlling unit generates the internal reset signal for the predetermined time period in response to the detection of a hangup by said CPU monitoring circuit.

9. The semiconductor integrated circuit as claimed in claim 7, further comprising a timer counter configured for timekeeping, wherein said reset controlling unit generates the internal reset signal for the predetermined time period in response to a predetermined count counted by said time counter.

* * * * *

UNITED STATES PATENT AND TRADEMARK OFFICE
CERTIFICATE OF CORRECTION

PATENT NO. : 7,219,248 B2
APPLICATION NO. : 10/968120
DATED : May 15, 2007
INVENTOR(S) : Takashi Shikata It is certified that error appears in the above-identified patent and that said Letters Patent is hereby corrected as shown below:

Title Page, Column 2 item 57 (Abstract), Line 2, after "unit," change "a" to --an--.

Column 9, Line 33, before "on-chip memory" change "a" to --an--.

Signed and Sealed this

Eleventh Day of September, 2007

JON W. DUDAS
*Director of the United States Patent and Trademark Office*